United States Patent [19]

Packo

[11] Patent Number: 5,050,388

[45] Date of Patent: Sep. 24, 1991

[54] RECLAIMING OF REFRIGERANT FLUIDS TO MAKE SAME SUITABLE FOR REUSE

[75] Inventor: Joseph J. Packo, St. Simons Island, Ga.

[73] Assignee: American Patent Group, St. Simons Island, Ga.

[21] Appl. No.: 532,862

[22] Filed: Jun. 4, 1990

Related U.S. Application Data

[63] Continuation-in-part of Ser. No. 515,482, Apr. 27, 1990.

[51] Int. Cl.$^5$ .............................................. F25B 45/00
[52] U.S. Cl. .................................. 62/77; 62/149; 62/292; 62/475
[58] Field of Search ............... 252/67, 68, 78.3; 62/114, 474, 77, 149, 292, 475

[56] References Cited

U.S. PATENT DOCUMENTS

| | | | |
|---|---|---|---|
| 3,232,070 | 2/1966 | Sparano | 62/149 |
| 3,912,651 | 10/1975 | Brown | 252/78 |
| 4,237,172 | 12/1980 | Packo | 428/63 |
| 4,261,178 | 4/1981 | Cain | 62/149 |
| 4,285,206 | 8/1981 | Koser | 62/126 |
| 4,331,722 | 5/1982 | Packo et al. | 428/35 |
| 4,363,222 | 12/1982 | Cain | 62/292 |
| 4,364,236 | 12/1982 | Lower et al. | 62/77 |
| 4,379,067 | 4/1983 | Packo | 252/67 |
| 4,441,330 | 4/1984 | Lower et al. | 62/149 |
| 4,442,015 | 4/1984 | Packo et al. | 252/68 |
| 4,476,688 | 10/1984 | Goddard | 62/149 |
| 4,480,446 | 11/1984 | Margulefsky et al. | 62/474 |
| 4,508,631 | 4/1985 | Packo | 252/68 |
| 4,539,817 | 9/1985 | Staggs et al. | 62/149 |
| 4,554,792 | 11/1985 | Margulefsky et al. | 62/77 |
| 4,646,527 | 3/1987 | Taylor | 62/85 |
| 4,761,961 | 8/1988 | Marx | 62/55 |
| 4,766,733 | 8/1988 | Scuderi | 62/85 |
| 4,768,347 | 9/1988 | Manz et al. | 62/149 |
| 4,776,174 | 10/1988 | Rich et al. | 62/77 |
| 4,805,416 | 2/1989 | Manz et al. | 62/292 |
| 4,809,515 | 3/1989 | Houwink | 62/149 |
| 4,809,520 | 3/1989 | Manz et al. | 62/292 |
| 4,856,289 | 8/1989 | Lofland | 62/149 |
| 4,856,290 | 8/1989 | Rodda | 62/149 |
| 4,862,699 | 9/1989 | Lounis | 62/84 |
| 4,878,356 | 11/1989 | Punches et al. | 62/149 |
| 4,887,433 | 12/1989 | Anderson, Jr. | 62/85 |
| 4,903,499 | 2/1990 | Merritt | 62/149 |
| 4,909,042 | 3/1990 | Proctor et al. | 62/149 |

*Primary Examiner*—Lloyd L. King
*Attorney, Agent, or Firm*—Browdy and Neimark

[57] ABSTRACT

A system to remove moisture chemically from refrigerant fluid being recaptured, recycled or reclaimed comprises adding an appropriate organosilane to the refrigerant being treated in the reclamation/recycling apparatus.

14 Claims, No Drawings

RECLAIMING OF REFRIGERANT FLUIDS TO MAKE SAME SUITABLE FOR REUSE

This is a CIP of co-pending application Ser. No. 07/515,485, filed Apr. 27, 1990, the contents of which are incorporated by reference.

FIELD OF THE INVENTION

The present invention concerns the recovery, recycling and/or reclaiming of refrigerant fluids, especially fluorocarbons in order to improve the environment.

BACKGROUND OF THE INVENTION

It is known that certain chemical fluids, especially chlorofluorocarbons (hereinafter CFCs), destroy the ozone layer which serves to protect all life on the planet Earth from the effects of ultraviolet radiation from the Sun. As a consequence, CFCs have been phased out in the use of propellants for aerosol sprays. On the other hand, because CFCs are exceptionally good refrigerants, their use as refrigerant fluids has continued and it is expected will continue for many years both in refrigeration circuits and air conditioning circuits.

The patent literature contains many disclosures of systems for the recovery and/or recycling of refrigerants to prevent their escape into the atmosphere. Among these there may be briefly mentioned the Cain U.S. Pat. No. 4,261,178; Lofland U.S. Pat. No. 4,856,289; Lounis U.S. Pat. No. 4,862,699; Sparano U.S. Pat. No. 3,232,070; Merritt U.S. Pat. No. 4,903,499; and Proctor U.S. Pat. No. 4,909,042. Of these, Lofland '289 discloses the distilling off of CFCs leaving water behind, and further uses a drier with an absorptive medium such as activated charcoal to absorb any residual water. Lounis '699 mentions the use of a filter/dryer, as do other patents in this field including Staggs U.S. Pat. No. 4,539,817 and Taylor U.S. Pat. No. 4,646,527, as well as the Manz et al U.S. Pat. Nos. 4,768,347, 4,805,416 and 4,809,520.

Anderson U.S. Pat. No. 4,887,435 discloses a refrigeration cleaning and flushing system which uses a dehydrator filled with what is apparently a solid desiccant. Koser U.S. Pat. No. 4,285,206 also mentions the use of desiccants such as silica gel, activated aluminum oxide, barium oxide and phosphorous pentoxide. The patents to Margulefsky et al U.S. Pat. Nos. 4,480,446 and 4,554,792 disclose the use of filter elements of activated alumina, cellulose fibers or the like to remove moisture. Goddard 4,476,688 uses an acid purification filter-drier to remove moisture. The patents to Lower et al U.S. Pat. Nos. 4,364,236 and 4,441,330 mention the use of molecular sieve filters of activated alumina.

All of these prior systems for recycling and/or reclaiming of CFCs suffer from loss of filter efficiency over time and the need to frequently replace the water-removing filters.

The Rodda U.S. Pat. No. 4,856,290 appears to attempt to remove water by the use of oil to isolate the water in the system, after which the oil and water are drained away. Other systems, including the system of Lofland '289 mentioned above as well as Taylor '527, in part or in whole use distillation to separate CFCs from water. These systems suffer from undue complexity as do some of the filtering systems mentioned above. All of the prior systems, insofar as is known, suffer from the inability to reduce the moisture content of CFCs to below 20 ppm without great difficulty and below 10 ppm even if extra-ordinary care is taken.

The need for efficient reclamation and recycling of CFCs has recently become eve greater than previously, because of the recent passage of the Clean Air Act and similar legislation in various states. An excise tax has been imposed on certain refrigerants providing great economic incentive for recycling/reclamation. Some states are in the process of establishing laws to make refrigerant recovery and recycling/reclamation mandatory or to restrict refrigerant disposition to hazardous waste sites.

Production curtailments of certain refrigerants will inevitably result in higher prices for all refrigerants, and refrigerant recovery and recycling/reclamation will become increasingly important from an economic point of view as well as an environmental.

The Packo et al U.S. Pat. Nos. 4,237,172; 4,304,805; 4,331,722; 4,379,067; and 4,442,015 disclose the use of various types of organosilane compounds for sealing leaks in piping systems including air conditioning and refrigeration circuits, which organosilane compounds react with water at the situs of the leak to thereby seal such leak. These Packo et al U.S. patents are hereby incorporated by reference.

The Brown U.S. Pat. No. 3,912,651 discloses the use of acyloxy silanes in hydraulic and damping liquids based on end blocked polydimethylsiloxanes. The silane reacts with water in the polydimethyl siloxane fluid thereby preventing an accumulation of liquid water in the fluid system. The contents of said Brown U.S. Pat. No. 651 are hereby incorporated by reference.

The Packo et al U.S. Pat. No. 4,508,631 is directed to the incorporation of certain organosilane compounds in air conditioning and refrigeration circuits in order to sequester the moisture present in such circuits and thereby increase the life of the refrigeration circuits and so that corrosion leaks will not develop. Such Packo et al U.S. Pat. No. 4,508,631 is hereby incorporated by reference.

SUMMARY OF THE INVENTION

It is accordingly an object of the present invention to overcome deficiencies in the prior art, such as indicated above.

It is another object of the present invention to improve recovery, recycling and/or reclamation of refrigerant fluids, and especially CFCs.

It is a further object of the present invention to improve such prior systems so that the moisture content of the refrigerants can be reduced to less than five-six parts per million, and indeed even to less than one part per million.

It is still another object of the present invention to improve systems of the prior art by reducing their complexity.

These and other objects and the nature and advantages of the present invention will become more apparent from the following description, both general and detailed. Generally, the invention involves the use of any suitable water scavenging liquid, such as those disclosed in the aforementioned Packo et al patents and the Brown patent, in the reclaiming/recycling circuits of the prior art in order to convert the moisture content of the refrigerant being treated to the level of less than 20 ppm and preferably no more than 5–6 ppm or even to a level lower than 1 ppm. This also permits simplification of the prior art methods and apparatus, for example it permits simplification of the equipment of those systems and especially the elimination of certain filters in some cases and/or the prolongation of the life of such filters.

Detailed Description of Embodiments

According to the present invention, a liquid which scavenges, sequesters, reacts with (e.g. such as by hydrolyzing) or otherwise removes moisture from commonly used refrigerants, especially CFCs, and which exists as a liquid in the liquid phase of such refrigerant, is added to the refrigerant while such refrigerant is in the circuit of the recovery apparatus. Such a liquid is hereinafter sometimes referred to as a moisture-removing or moisture-capturing liquid.

The nature of the moisture-capturing liquid is important, but the scope of suitable moisture-capturing liquids is very wide. The moisture-removing liquid should be:

(1) effective when used in reasonable quantities to bring the moisture content of the refrigerant down to below 20 parts per million, preferably to below 15 ppm, more preferably to below 10 ppm, even more preferably to below 5-6 ppm, and most preferably to below 1 ppm;

(2) a material whose reaction product with water is a solid which is easily separable from the refrigerant by filtration, distillation, decanting or the like, or a liquid which can either remain with the refrigerant without adverse effect or which is less volatile than the refrigerant fluid itself and is easily separable from the refrigerant by filtration, distillation, decanting or the like if it is desired to be separable;

(3) sufficiently non-toxic and non-corrosive so as to be safe to use and not have any deleterious effect on the recovery apparatus and the refrigerant fluid itself, and preferably non-flammable and nonexplosive;

(4) substantially non-reactive with the refrigerant fluid itself in the sense of not causing a substantial loss of refrigerant fluid and/or not causing a deleterious reaction product; and (5) a liquid which is less volatile than the refrigerant fluid itself if it is desired to be separable.

Suitable moisture-removing liquids can be selected from among those disclosed in the aforementioned Packo et al patents and the aforementioned Brown patent. Other candidates include tri-methyl borate and the silanes mentioned in Bent et al U.S. Pat. No. 2,265,962; Ceyzeriat U.S. Pat. No. 3,580,939; the Anderson U.S. Pat. Nos. 3,608,000; 3,634,560; 3,711,305 and 3,716,384, among others.

The moisture-removing liquid may be introduced into the liquid phase refrigerant in the recovery apparatus, or it may even be introduced into the gaseous phase of the refrigerant. Alternatively, the moisture-capturing liquid may be introduced into the recovery circuit at two different places, such as a portion of the circuit where the refrigerant is in the gaseous state and a portion of the circuit where the refrigerant is in the liquid state. The introduction may be effected anywhere in the decontaminating circuit.

It is preferred, however, that the liquid organosilane be introduced in the liquid state into the recaptured refrigerant while the latter is in the liquid state and preferably at room temperature, after the first decontamination cycle in which most of the moisture, acid and other contaminants have been removed, thereby requiring the use of less moisture-removing liquid. This preferred operation provides cost advantages. In addition, because the concentration of the moisture-removing liquid is higher in the liquid state of the refrigerant, moisture is more efficiently sequestered during this stage.

It is also desirable that the moisture-removing liquid be well mixed with the refrigerant fluid. This ma desirably be done by metering in the moisture-removing liquid while the refrigerant fluid is flowing to the holding tank, such as from the air-conditioning or refrigeration unit to the holding tank or preferably after a first pass through the apparatus as the refrigerant flows to the holding tank prior to a second pass through the equipment.

The quantity of moisture-removing liquid used depends on the amount of moisture in the refrigerant, the effectiveness and weight of the moisture-removing liquid, and the degree of moisture removal desired. In general, 1-10 moles of moisture-removing liquid will be used per mole of water in the refrigerant fluid.

Certain exemplary embodiments are disclosed in more detail below:

EXAMPLE 1

Using a refrigeration cleaning and flushing system similar to that of the recently issued Anderson U.S. Pat. No. 4,887,435, but without the dehydrators disclosed therein, a mixture of 95% bis(dimethylamino) dimethylsilane in combination with 5% tris (dimethylamino) methylsilane is injected into the circuit upstream of the filter. The silane reacts with the moisture in the CFC refrigerant forming a solid which is caught by the filter.

EXAMPLE 2

Using the same reclamation system as used in Example 1, dimethyl-bis-(2-methylbutanoyl) silane is injected into the CFC in the liquid phase where it reacts with moisture in the CFC to form a liquid which is non-miscible with and separable from the CFC.

EXAMPLE 3

Again using the same reclamation system as used in Example 1, bis(isopropylamino) methylsilane is injected into the CFC in the liquid phase where it reacts with moisture to form a filterable solid.

EXAMPLE 4

Example 3 is repeated using bis(drmethylamino) methylsilane.

EXAMPLE 5

Example 3 is repeated using dimethyl bis (methylmercapto) silane.

EXAMPLE 6

Example 2 is repeated using an excess of trimethylethoxysilane, thereby forming a silicone oil.

EXAMPLE 7

Example 2 is repeated using an excess of a mixture of 95% dimethyl diethoxysilane and 5% trimethylethoxysilane. Again a silicone oil is formed by reaction with the moisture.

EXAMPLE 8

Using a recovery, reclamation and recycling apparatus similar to that of the Lofland '289, refrigerant is removed from a refrigeration unit and is emptied into a holding tank. From the holding tank, the refrigerant is passed through the reclamation circuit a first time and then back to the holding tank. Immediately upstream of the holding tank following the first pass through the reclamation circuit, a mixture of 95% dimethyl diethoxysilane and 5% trimethylethoxy silane is metered slowly into the flowing refrigerant fluid in its liquid state in such a way as to achieve good mixing with the refrigerant. The quantity used based on a moisture content of 20 parts per million of $H_2O$ is 0.00014 lbs. of said silane mixture per pound of Freon refrigerant. A silicone oil is formed by reaction of the organosilane with the moisture.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a method for the recycling and/or reclamation of a refrigerant fluid which has been removed from an air conditioning or refrigeration unit, comprising passing said refrigerant through a reclamation and/or decontamination circuit in which moisture, acid and other contaminants are removed, the improvement comprising injecting into said refrigerant fluid a moisture-removing liquid in an amount sufficient to reduce the moisture content of said refrigerant to below 20 ppm.

2. A method according to claim 1 wherein said amount sufficient is an amount sufficient to reduce the moisture content of said refrigerant fluid to below 15 ppm.

3. A method according to claim 1 wherein said amount sufficient is an amount sufficient to reduce the moisture content to below 10 ppm.

4. A method according to claim 1 wherein said amount sufficient is an amount sufficient to reduce the moisture content to below 5-6 ppm.

5. A method according to claim 1 wherein said amount sufficient is an amount sufficient to reduce the moisture content to below 1 ppm.

6. A method according to claim 1 wherein said moisture removing liquid is injected into said circuit after said refrigerant fluid has passed through a first cycle in said circuit.

7. A method according to claim 1 wherein said circuit contains a holding tank, and wherein said moisture removing liquid is injected immediately upstream of said holding tank.

8. A method according to claim 1 wherein said moisture removing liquid is hydrolizable.

9. A method according to claim 8 wherein said moisture removing liquid is an organosilane.

10. In a method for the recovery, recycling and/or reclamation of a refrigerant fluid which has been removed from an air-conditioning or refrigeration circuit, comprising passing said refrigerant through a reclamation and/or decontamination circuit in which moisture, acid and other contaminants are removed, the improvement comprising injecting into said refrigerant fluid an hydrolyzable organosilane which exists as a liquid in the liquid phase of said refrigerant and which is capable of removing moisture from said refrigerant without forming a solid upon hydrolization, in an amount sufficient to reduce the moisture content of said refrigerant to below 20 ppm.

11. A method according to claim 10 wherein said amount sufficient is an amount sufficient to reduce the moisture content of said refrigerant to below 15 ppm.

12. A method according to claim 10 wherein said amount sufficient is an amount sufficient to reduce the moisture content to below 10 ppm.

13. A method according to claim 10 wherein said amount sufficient is an amount sufficient to reduce the moisture content to below 5-6 ppm.

14. A method according to claim 10 wherein said amount sufficient is an amount sufficient to reduce the moisture content to below 1 ppm.

* * * * *